United States Patent
Joshi et al.

(10) Patent No.: US 10,783,566 B2
(45) Date of Patent: Sep. 22, 2020

(54) EMERGENCY MANAGEMENT SYSTEM

(71) Applicant: Visa International Service Association, San Francisco, CA (US)

(72) Inventors: Mahesh Joshi, San Francisco, CA (US); Ankur Raina, Santa Clara, CA (US); Teresa Ho, San Jose, CA (US); Todd Winners, Ashburn, VA (US)

(73) Assignee: Visa International Service Association, San Francisco, CA (US)

( * ) Notice: Subject to any disclaimer, the term of this patent is extended or adjusted under 35 U.S.C. 154(b) by 152 days.

(21) Appl. No.: 16/034,767

(22) Filed: Jul. 13, 2018

(65) Prior Publication Data

US 2019/0019232 A1 Jan. 17, 2019

Related U.S. Application Data

(60) Provisional application No. 62/532,726, filed on Jul. 14, 2017.

(51) Int. Cl.
*G06Q 30/00* (2012.01)
*G06Q 30/06* (2012.01)
*G06F 16/29* (2019.01)

(52) U.S. Cl.
CPC ......... *G06Q 30/0613* (2013.01); *G06F 16/29* (2019.01)

(58) Field of Classification Search
CPC ............. G06Q 10/087; G06Q 20/3224; G06Q 30/0639; G06Q 30/0601–0645; G06Q 30/80; Y04S 10/54
USPC ..... 705/26.1, 27.1, 26.2, 26.25, 26.3, 26.35, 705/26.4, 26.41, 26.42, 26.43, 26.44, 705/26.5, 26.6, 26.61, 26.62, 26.63, 705/26.64, 26.7, 26.8, 26.81, 26.82, 26.9, 705/27.2

See application file for complete search history.

(56) References Cited

U.S. PATENT DOCUMENTS

2014/0006096 A1* 1/2014 Groarke ................. G06Q 30/02
 705/7.29
2014/0189887 A1* 7/2014 Raju ....................... H04L 63/08
 726/28

(Continued)

OTHER PUBLICATIONS

Anonymous, "Know How to Find Out Changes in Operating Status During Winter Weather, Other Emergencies," Jan. 4, 2017, Targeted News Service.*

*Primary Examiner* — Brandy A Zukanovich
(74) *Attorney, Agent, or Firm* — The Webb Law Firm

(57) ABSTRACT

Provided is a system for determining a status of at least one merchant during or after an emergency event including at least one processor to retrieve historical transaction data for at least one merchant associated with a merchant category code (MCC), determine a first transaction count for the at least one merchant based on the historical transaction data for the at least one merchant, retrieve current transaction data for the at least one merchant, determine a second transaction count for the at least one merchant based on the current transaction data for the at least one merchant, classify the at least one merchant based at least partially on a comparison between the first transaction count and the second transaction count, and display a classification of the at least one merchant based on classifying the at least one merchant. A method and computer program product are also disclosed.

20 Claims, 5 Drawing Sheets

(56) References Cited

U.S. PATENT DOCUMENTS

2015/0161585 A1* 6/2015 Huster ............... G06Q 20/3224
　　　　　　　　　　　　　　　　　　　　　　　　705/44
2016/0379327 A1* 6/2016 Bhatt et al. .......... G06Q 50/265

* cited by examiner

EMERGENCY MANAGEMENT SYSTEM

CROSS REFERENCE TO RELATED APPLICATION

This application claims priority to U.S. Patent Application No. 62/532,726, filed Jul. 14, 2017 which is incorporated herein by reference in its entirety.

BACKGROUND OF THE INVENTION

1. Field of the Invention

This invention relates generally to systems, methods, and computer program products for determining operational status of merchants and/or financial institutions and, in non-limiting embodiments, to a system, method, and computer program product for determining operational status of merchants and/or financial institutions during or after an emergency event.

2. Technical Considerations

An emergency event may be a serious disruption of the functioning of a group of people (e.g., a community, a society, and/or the like) involving widespread human, material, economic and/or environmental loss and impacts, which exceeds the ability of the affected group of people to cope using resources of the group of people. For example, an emergency event may include a disaster caused by a hurricane, tornado, severe storm, earthquake, and/or the like.

During and/or after an emergency event, members of a group of people may desire and/or need to find resources, such as goods and/or services (e.g., goods and/or services provided by a merchant, services provided by a financial institution, and/or the like) in a geographical area. For example, during and/or after an emergency event, members of the group of people may desire and/or need to find food, fuel, and/or the like that is provided by a merchant in a geographical area that is close to the group of people.

However, identifying a merchant and/or a financial institution that are operating, that are operating at a limited capacity, and/or that is non-operational may be difficult. For example, after a severe storm affects a region (e.g., a geographic area) and communication networks are not operational (e.g., a cell phone network that is not operational), identifying a merchant that provides fuel that is non-operational (e.g., unable to sell fuel based on a lack of fuel) may not be possible without an individual traveling to a location of the merchant and determining if the merchant is non-operational. Additionally, it may not be possible to identify a financial institution and/or an automated teller machine associated with a financial institution that is non-operational (e.g., based on a lack of electricity) without an individual traveling to a location of the financial institution and/or the automated teller machine and determining if the financial institution and/or the automated teller machine is non-operational.

SUMMARY OF THE INVENTION

Accordingly, it is an object of the present invention to provide a system, method, and apparatus for determining an operational status of a merchant and/or a financial institution that overcomes some or all of the deficiencies of the prior art.

According to non-limiting embodiments, provided is a system for determining a status of at least one merchant during or after an emergency event comprising: at least one processor, wherein the at least one processor is programmed or configured to: retrieve historical transaction data for at least one merchant associated with a merchant category code (MCC), wherein the historical transaction data is associated with a time interval prior to an emergency event; determine a first transaction count for the at least one merchant based on the historical transaction data for the at least one merchant; retrieve current transaction data for the at least one merchant, where the current transaction data is associated with a time interval during or after the emergency event; determine a second transaction count for the at least one merchant based on the current transaction data for the at least one merchant; classify the at least one merchant based at least partially on a comparison between the first transaction count and the second transaction count; and display a classification of the at least one merchant based on classifying the at least one merchant.

According to non-limiting embodiments, provided is a computer-implemented method for determining a status of at least one merchant during or after an emergency event, comprising: retrieving, with at least one processor, historical transaction data for at least one merchant associated with an MCC, wherein the historical transaction data is associated with a time interval prior to an emergency event; determining, with at least one processor, a first transaction count for the at least one merchant based on the historical transaction data for the at least one merchant; retrieving, with at least one processor, current transaction data for the at least one merchant, where the current transaction data is associated with a time interval during or after the emergency event; determining, with at least one processor, a second transaction count for the at least one merchant based on the current transaction data for the at least one merchant; classifying, with at least one processor, the at least one merchant based at least partially on a comparison between the first transaction count and the second transaction count; and displaying, with at least one processor, a classification of the at least one merchant based on classifying the at least one merchant.

According to non-limiting embodiments, provided is a computer program product for determining a status of at least one merchant during or after an emergency event, the computer program product comprising at least one non-transitory computer-readable medium including one or more instructions that, when executed by at least one processor, cause the at least one processor to: retrieve historical transaction data for at least one merchant associated with an MCC, wherein the historical transaction data is associated with a time interval prior to an emergency event; determine a first transaction count for the at least one merchant based on the historical transaction data for the at least one merchant; retrieve current transaction data for the at least one merchant, where the current transaction data is associated with a time interval during or after the emergency event; determine a second transaction count for the at least one merchant based on the current transaction data for the at least one merchant; classify the at least one merchant based at least partially on a comparison between the first transaction count and the second transaction count; and display a classification of the at least one merchant based on classifying the at least one merchant.

Clause 1: A system for determining a status of at least one merchant during or after an emergency event comprising: at least one processor, wherein the at least one processor is programmed or configured to: retrieve historical transaction data for at least one merchant associated with an MCC, wherein the historical transaction data is associated with a time interval prior to an emergency event; determine a first transaction count for the at least one merchant based on the historical transaction data for the at least one merchant; retrieve current transaction data for the at least one merchant, where the current transaction data is associated with a time interval during or after the emergency event; determine a second transaction count for the at least one merchant based on the current transaction data for the at least one merchant; classify the at least one merchant based at least partially on a comparison between the first transaction count and the second transaction count; and display a classification of the at least one merchant based on classifying the at least one merchant.

Clause 2: The system of clause 1, wherein the MCC identifies at least one of the following merchant categories: fueling stations, grocery stores, hardware stores, or any combination thereof.

Clause 3: The system of clauses 1 or 2, wherein, when classifying the at least one merchant, the at least one processor is programmed or configured to classify the at least one merchant according to an operational status of the at least one merchant.

Clause 4: The system of any of clauses 1-3, wherein, when classifying the at least one merchant according to the operational status of the at least merchant, the at least one processor is programmed or configured to classify the at least one merchant according to the operational status of the at one least merchant based at least partially on a predetermined threshold value of a difference between the first transaction count and the second transaction count.

Clause 5: The system of any of clauses 1-4, wherein, when displaying a classification of the at least one merchant, the at least one processor is programmed or configured to display a map of a geographical area that includes a location of the at least one merchant, wherein the map includes an operational status of the at least one merchant.

Clause 6: The system of any of clauses 1-5, wherein the at least one processor is further programmed or configured to determine a geographical area in which the at least one merchant is located; and wherein, when displaying the classification of the at least one merchant, the at least one processor is programmed or configured to: display the classification of the at least one merchant within the geographical area.

Clause 7: The system of any of clauses 1-6, wherein the at least one merchant is a plurality of merchants, wherein the at least one processor is further programmed or configured to: determine the MCC associated with the plurality of merchant located in a geographical area based on a location of the emergency event; and wherein, when retrieving the historical transaction data for the plurality of merchants, the at least one processor is programmed or configured to: retrieve the historical transaction data for the plurality of merchants based on the MCC for the plurality of merchants.

Clause 8: A computer-implemented method for determining a status of at least one merchant during or after an emergency event, comprising: retrieving, with at least one processor, historical transaction data for at least one merchant associated with an MCC, wherein the historical transaction data is associated with a time interval prior to an emergency event; determining, with at least one processor, a first transaction count for the at least one merchant based on the historical transaction data for the at least one merchant; retrieving, with at least one processor, current transaction data for the at least one merchant, where the current transaction data is associated with a time interval during or after the emergency event; determining, with at least one processor, a second transaction count for the at least one merchant based on the current transaction data for the at least one merchant; classifying, with at least one processor, the at least one merchant based at least partially on a comparison between the first transaction count and the second transaction count; and displaying, with at least one processor, a classification of the at least one merchant based on classifying the at least one merchant.

Clause 9: The computer-implemented method of clause 8, wherein the MCC identifies at least one of the following merchant categories: fueling stations, grocery stores, hardware stores, or any combination thereof.

Clause 10: The computer-implemented method of clauses 8 or 9, wherein classifying the at least one merchant comprises classifying the at least one merchant according to an operational status of the at least one merchant.

Clause 11: The computer-implemented method of any of clauses 8-10, wherein classifying the at least one merchant according to the operational status of the at least merchant comprises classifying the at least one merchant according to the operational status of the at one least merchant based at least partially on a predetermined threshold value of a difference between the first transaction count and the second transaction count.

Clause 12: The computer-implemented method of any of clauses 8-11, further comprising displaying a map of a geographical area that includes a location of the at least one merchant, wherein the map includes an operational status of the at least one merchant.

Clause 13: The computer-implemented method of any of clauses 8-12, further comprising determining a geographical area in which the at least one merchant is located; and wherein displaying the classification of the at least one merchant comprises: displaying the classification of the at least one merchant within the geographical area.

Clause 14: The computer-implemented method of any of clauses 8-13, wherein the at least one merchant is a plurality of merchants, the method further comprising: determining the MCC associated with the plurality of merchant located in a geographical area based on a location of the emergency event; and wherein retrieving the historical transaction data for the plurality of merchants comprises: retrieving the historical transaction data for the plurality of merchants based on the MCC for the plurality of merchants.

Clause 15: A computer program product for determining a status of at least one merchant during or after an emergency event, the computer program product comprising at least one non-transitory computer-readable medium including one or more instructions that, when executed by at least one processor, cause the at least one processor to: retrieve historical transaction data for at least one merchant associated with an MCC, wherein the historical transaction data is associated with a time interval prior to an emergency event; determine a first transaction count for the at least one merchant based on the historical transaction data for the at least one merchant; retrieve current transaction data for the at least one merchant, where the current transaction data is associated with a time interval during or after the emergency event; determine a second transaction count for the at least one merchant based on the current transaction data for the at least one merchant; classify the at least one merchant based at least partially on a comparison between the first transaction count and the second transaction count; and display a classification of the at least one merchant based on classifying the at least one merchant.

Clause 16: The computer program product of clause 15, wherein the one or more instructions, that cause the at least one processor to classify the at least one merchant, cause the at least one processor to classify the at least one merchant according to an operational status of the at least one merchant.

Clause 17: The computer program product of clauses 15 or 16, wherein the one or more instructions, that cause the at least one processor to classify the at least one merchant according to the operational status of the at least merchant, cause the at least one processor to classify the at least one merchant according to the operational status of the at one least merchant based at least partially on a predetermined threshold value of a difference between the first transaction count and the second transaction count.

Clause 18: The computer program product of any of clauses 15-17, wherein the one or more instructions, that cause the at least one processor to display a classification of the at least one merchant, cause the at least one processor to display a map of a geographical area that includes a location of the at least one merchant, wherein the map includes an operational status of the at least one merchant.

Clause 19: The computer program product of any of clauses 15-18, wherein the one or more instructions, when executed by the at least one processor, further cause the at least one processor to: determine a geographical area in which the at least one merchant is located; and wherein the one or more instructions, that cause the at least one processor to display the classification of the at least one merchant, cause the at least one processor to: display the classification of the at least one merchant within the geographical area.

Clause 20: The computer program product of any of clauses 15-19, wherein the at least one merchant is a plurality of merchants, wherein the one or more instructions, when executed by the at least one processor, further cause the at least one processor to: determine the MCC associated with the plurality of merchant located in a geographical area based on a location of the emergency event; and wherein the one or more instructions, that cause the at least one processor to retrieve the historical transaction data for the plurality of merchants, cause the at least one processor to: retrieve the historical transaction data for the plurality of merchants based on the MCC for the plurality of merchants.

Clause 21: A system for determining a status of at least one financial institution during or after an emergency event comprising: at least one processor, wherein the at least one processor is programmed or configured to: retrieve historical transaction data for at least one financial institution associated with a transaction type for a financial institution, wherein the historical transaction data is associated with a time interval prior to an emergency event; determine a first transaction count for the at least one financial institution based on the historical transaction data for the at least one financial institution; retrieve current transaction data for the at least one financial institution, where the current transaction data is associated with a time interval during or after the emergency event; determine a second transaction count for the at least one merchant based on the current transaction data for the at least one financial institution; classify the at least one financial institution based at least partially on a comparison between the first transaction count and the second transaction count; and display a classification of the at least one financial institution based on classifying the at least one merchant.

Clause 22: The system of clause 1, wherein the transaction type for a financial institution identifies an ATM transaction type.

Clause 23: The system of clauses 1 or 2, wherein, when classifying the at least one financial institution, the at least one processor is programmed or configured to classify the at least one merchant according to an operational status of the at least one financial institution.

Clause 24: The system of any of clauses 1-3, wherein, when classifying the at least one financial institution according to the operational status of the at least financial institution, the at least one processor is programmed or configured to classify the at least one financial institution according to the operational status of the at one least financial institution based at least partially on a predetermined threshold value of a difference between the first transaction count and the second transaction count.

Clause 25: The system of any of clauses 1-4, wherein, when displaying a classification of the at least one financial institution, the at least one processor is programmed or configured to display a map of a geographical area that includes a location of the at least one financial institution, wherein the map includes an operational status of the at least one financial institution.

Clause 26: The system of any of clauses 1-5, wherein the at least one processor is further programmed or configured to determine a geographical area in which the at least one financial institution is located; and wherein, when displaying the classification of the at least one financial institution, the at least one processor is programmed or configured to: display the classification of the at least one financial institution within the geographical area.

Clause 27: The system of any of clauses 1-6, wherein the at least one financial institution is a plurality of financial institutions, wherein the at least one processor is further programmed or configured to: determine the transaction type associated with the plurality of financial institutions located in a geographical area based on a location of the emergency event; and wherein, when retrieving the historical transaction data for the plurality of financial institution, the at least one processor is programmed or configured to: retrieve the historical transaction data for the plurality of financial institution based on the transaction type for a financial institution.

Clause 28: A computer-implemented method for determining a status of at least one financial institution during or after an emergency event, comprising: retrieving, with at least one processor, historical transaction data for at least one financial institution associated with a transaction type for a financial institution, wherein the historical transaction data is associated with a time interval prior to an emergency event; determining, with at least one processor, a first transaction count for the at least one financial institution based on the historical transaction data for the at least one financial institution; retrieving, with at least one processor, current transaction data for the at least one financial institution, where the current transaction data is associated with a time interval during or after the emergency event; determining, with at least one processor, a second transaction count for the at least one financial institution based on the current transaction data for the at least one financial institution; classifying, with at least one processor, the at least one financial institution based at least partially on a comparison between the first transaction count and the second transaction count; and displaying, with at least one processor, a classification of the at least one financial institution based on classifying the at least one financial institution.

Clause 29: The computer-implemented method of clause 28, wherein the transaction type for a financial institution identifies an ATM transaction type.

Clause 30: The computer-implemented method of clauses 28 or 29, wherein classifying the at least one financial institution comprises classifying the at least one financial institution according to an operational status of the at least one financial institution.

Clause 31: The computer-implemented method of any of clauses 28-30, wherein classifying the at least one financial institution according to the operational status of the at least financial institution comprises classifying the at least one financial institution according to the operational status of the at one least financial institution based at least partially on a predetermined threshold value of a difference between the first transaction count and the second transaction count.

Clause 32: The computer-implemented method of any of clauses 28-31, further comprising displaying a map of a geographical area that includes a location of the at least one financial institution, wherein the map includes an operational status of the at least one financial institution.

Clause 33: The computer-implemented method of any of clauses 28-32, further comprising determining a geographical area in which the at least one financial institution is located; and wherein displaying the classification of the at least one financial institution comprises: displaying the classification of the at least one financial institution within the geographical area.

Clause 34: The computer-implemented method of any of clauses 28-33, wherein the at least one financial institution is a plurality of financial institutions, the method further comprising: determining the transaction type associated with the plurality of financial institution located in a geographical area based on a location of the emergency event; and wherein retrieving the historical transaction data for the plurality of financial institutions comprises: retrieving the historical transaction data for the plurality of financial institutions based on the transaction type for a financial institution.

Clause 35: A computer program product for determining a status of at least one financial institution during or after an emergency event, the computer program product comprising at least one non-transitory computer-readable medium including one or more instructions that, when executed by at least one processor, cause the at least one processor to: retrieve historical transaction data for at least one financial institution associated with a transaction type for a financial institution, wherein the historical transaction data is associated with a time interval prior to an emergency event; determine a first transaction count for the at least one financial institution based on the historical transaction data for the at least one financial institution; retrieve current transaction data for the at least one financial institution, where the current transaction data is associated with a time interval during or after the emergency event; determine a second transaction count for the at least one financial institution based on the current transaction data for the at least one financial institution; classify the at least one financial institution based at least partially on a comparison between the first transaction count and the second transaction count; and display a classification of the at least one financial institution based on classifying the at least one financial institution.

Clause 36: The computer program product of clause 35, wherein the one or more instructions, that cause the at least one processor to classify the at least one financial institution, cause the at least one processor to classify the at least one financial institution according to an operational status of the at least one financial institution.

Clause 37: The computer program product of clauses 35 or 36, wherein the one or more instructions, that cause the at least one processor to classify the at least one financial institution according to the operational status of the at least financial institution, cause the at least one processor to classify the at least one financial institution according to the operational status of the at one least financial institution based at least partially on a predetermined threshold value of a difference between the first transaction count and the second transaction count.

Clause 38: The computer program product of any of clauses 35-37, wherein the one or more instructions, that cause the at least one processor to display a classification of the at least one financial institution, cause the at least one processor to display a map of a geographical area that includes a location of the at least one financial institution, wherein the map includes an operational status of the at least one financial institution.

Clause 39: The computer program product of any of clauses 35-38, wherein the one or more instructions, when executed by the at least one processor, further cause the at least one processor to: determine a geographical area in which the at least one financial institution is located; and wherein the one or more instructions, that cause the at least one processor to display the classification of the at least one financial institution, cause the at least one processor to: display the classification of the at least one financial institution within the geographical area.

Clause 40: The computer program product of any of clauses 35-39, wherein the at least one financial institution is a plurality of financial institutions, wherein the one or more instructions, when executed by the at least one processor, further cause the at least one processor to: determine the transaction type associated with the plurality of financial institution located in a geographical area based on a location of the emergency event; and wherein the one or more instructions, that cause the at least one processor to retrieve the historical transaction data for the plurality of financial institutions, cause the at least one processor to: retrieve the historical transaction data for the plurality of financial institutions based on the transaction type for a financial institution.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
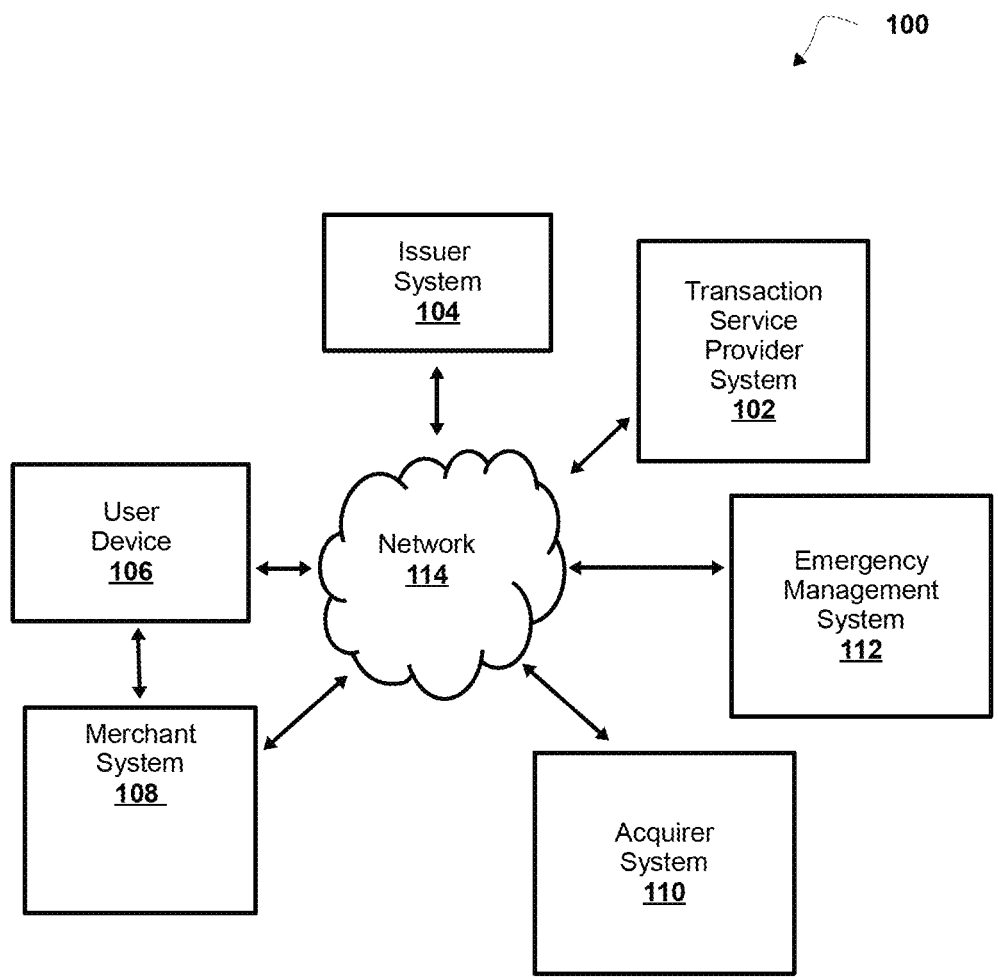
FIG. 1 is a diagram of a non-limiting embodiment of an environment in which systems, methods, apparatus, and/or computer program products, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No element, act, function, or instruction used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein, the term "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the terms "issuer institution," "portable financial device issuer," "issuer," or "issuer bank" may refer to one or more entities that provide accounts to customers for conducting payment transactions, such as initiating credit and/or debit payments. For example, an issuer institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" may also refer to one or more computer systems operated by or on behalf of an issuer, such as a server computer executing one or more software applications. For example, an issuer system may include one or more authorization servers for authorizing a payment transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) system" may refer to one or more computers and/or peripheral devices used by a merchant to conduct payment transactions with customers, including one or more card readers, NFC receivers, RFID receivers, and/or other contactless transceivers or receivers, contact-based receivers, payment terminals, computers, servers, input devices, and/or other like devices that may be used to initiate a payment transaction. A POS system (e.g., a merchant POS system) may also include one or more server computers programmed or configured to process online payment transactions through webpages, mobile applications, and/or the like. In some non-limiting embodiments, a merchant system may include one or more POS systems.

As used herein, the term "acquirer" may refer to an entity licensed by the transaction service provider and approved by the transaction service provider to originate transactions using a portable financial device associated with the transaction service provider. The transactions may include purchases, original credit transactions (OCTs), account funding transactions (AFTs), and other like payment transactions. The acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of payment facilitators and ensure proper due diligence occurs before signing a sponsored merchant. The acquirer may be liable for all transaction service provider programs that the transaction service provider operates or sponsors. The acquirer may be responsible for the acts of the acquirer's payment facilitators and the merchants or the acts of the merchants that the payment facilitators sponsor. An acquirer may be a financial institution, such as a bank. As used herein, the term "acquirer system" may also refer to one or more computer systems, computer devices, and/or the like operated by or on behalf of an acquirer, such as a server executing one or more software applications.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

The term "token" may refer to an identifier that is used as a substitute or replacement identifier for an original account identifier, such as a PAN. Tokens may be associated with a PAN or other original account identifier in one or more data structures (e.g., one or more databases, one or more repositories, one or more data repositories, one or more data tables, and/or the like) such that they may be used to conduct a transaction without directly using the original account identifier. In some non-limiting embodiments, an original account identifier, such as a PAN, may be associated with a plurality of tokens for different individuals or purposes. An issuer institution may be associated with a bank identification number (BIN) or a range of BINs that uniquely identify the issuer institution.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant, a security card, an access card, a wireless terminal, and/or a transponder, as examples. The portable financial device may include a volatile or a non-volatile memory to store information, such as an account identifier or a name of the account holder.

As used herein, the terms "client" and "client device" may refer to one or more client-side devices or systems, remote from a transaction service provider, used to initiate or facilitate a transaction. As an example, a "client device" may refer to one or more POS systems used by a merchant or one or more acquirer host computers used by an acquirer. It will be appreciated that a client device may be any electronic device configured to communicate with one or more networks and initiate or facilitate transaction such as, but not limited to, one or more computers, portable computers, tablet computers, cellular phones, wearable devices (e.g., watches, glasses, lenses, clothing, and/or the like), personal digital assistants (PDAs), and/or other like devices. Moreover, a "client" may also refer to an entity, such as a merchant or acquirer that owns, utilizes, and/or operates a client device for initiating transactions with a transaction service provider.

As used herein, the term "server" may refer to one or more computing devices, such as processors, storage devices, and/or similar computer components that communicate with client devices and/or other computing devices over a network, such as the Internet or private networks, and, in some non-limiting embodiments, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present invention may allow for determining an operational status of at least one merchant and/or at least one financial institution during or after an emergency event. For example, a system for determining an operational status of at least one merchant during or after an emergency event may include at least one processor that is programmed or configured to retrieve historical transaction data for at least one merchant and/or at least one financial institution, determine a first transaction count for the at least one merchant based on the historical transaction data for the at least one merchant and/or at least one financial institution, retrieve current transaction data for the at least one merchant, where the current transaction data is associated with a time interval during or after the emergency event, determine a second transaction count for the at least one merchant based on the current transaction data for the at least one merchant and/or at least one financial institution, classify the at least one merchant and/or at least one financial institution based at least partially on a comparison between the first transaction count and the second transaction count, and display a classification of the at least one merchant and/or at least one financial institution based on classifying the at least one merchant and/or at least one financial institution.

In this way, the system makes it possible to identify a merchant and/or a financial institution that is operating, that is operating at a limited capacity, and/or that is non-operational during or after an emergency event that affects a region without requiring an individual to travel to a location of the merchant and/or the financial institution and determine if the merchant and/or the financial institution is non-operational. For example, the system makes it possible to identify that the merchant and/or the financial institution is operating, is operating at a limited capacity, and/or is non-operational during or after an emergency event where a communication network is not operational.

Referring now to FIG. 1, FIG. 1 is a diagram of an example environment 100 in which devices, systems, and/or methods, described herein, may be implemented. As shown in FIG. 1, environment 100 includes transaction service provider system 102, issuer system 104, user device 106, merchant system 108, acquirer system 110, emergency management system 112, and network 114.

Transaction service provider system 102 may include one or more devices capable of receiving information from issuer system 104, user device 106, merchant system 108, acquirer system 110, and/or emergency management system 112 via network 114 and/or communicating information to issuer system 104, user device 106, merchant system 108, acquirer system 110, and/or emergency management system 112 via network 114. For example, transaction service provider system 102 may include a computing device, a server, a group of servers, and/or other like devices. In some non-limiting embodiments, transaction service provider system 102 may be associated with an entity (e.g., a transaction service provider) that operates a credit card network and that processes payments for credit accounts, debit accounts, credit cards, debit cards, and/or the like.

Issuer system 104 may include one or more devices capable of receiving information from transaction service provider system 102, user device 106, merchant system 108, acquirer system 110, and/or emergency management system 112 via network 114 and/or communicating information to transaction service provider system 102, user device 106, merchant system 108, acquirer system 110, and/or emergency management system 112 via network 114. For example, issuer system 104 may include a computing device, a server, a group of servers, and/or other like devices. In some non-limiting embodiments, the issuer system 104 may be associated with an issuer institution as described herein. For example, issuer system 104 may be associated with an issuer institution that issued a credit account, debit account, credit card, debit card, and/or the like to a user associated with user device 106.

User device 106 may include one or more devices capable of receiving information from transaction service provider system 102, issuer system 104, merchant system 108, acquirer system 110, and/or emergency management system 112 via network 114 and/or communicating information to transaction service provider system 102, issuer system 104, merchant system 108, acquirer system 110, and/or emergency management system 112 via network 114. User device 106 may also include a device capable of receiving information from merchant system 108 via a network (e.g., network 114), a communication connection (e.g., an NFC communication connection, an RFID communication connection, a Bluetooth® communication connection, etc.), and/or the like, or communicating information to merchant system 108 via the network, the communication connection, and/or the like. For example, user device 106 may include a client device, a computer device, a desktop computer, a laptop computer, a mobile device, a cellular phone (e.g., a smartphone, standard cellular phone, etc.), a portable computer, a wearable device (e.g., a watch, glasses, lenses, clothing, etc.), a PDA, and/or other like devices. In some non-limiting embodiments, user device 106 may be capable of engaging in a transaction with merchant system 108.

Merchant system 108 may include one or more devices capable of receiving information from transaction service provider system 102, issuer system 104, user device 106, acquirer system 110, and/or emergency management system 112 via network 114 and/or communicating information to transaction service provider system 102, issuer system 104, user device 106, acquirer system 110, and/or emergency management system 112 via network 114. Merchant system 108 may also include one or more devices capable of receiving information from user device 106 and/or acquirer system 110 via a network 114, a communication connection (e.g., an NFC communication connection, an RFID communication connection, a Bluetooth® communication connection, and/or the like), and/or the like, and/or communicating information to user device 106 and/or acquirer system 110 via the network, the communication connection, and/or the like. For example, merchant system 108 may include a computing device, a server, a group of servers, a client device, a group of client devices, and/or other like devices. In some non-limiting embodiments, merchant system 108 may include one or more user devices 106. For example, merchant system 108 may include user device 106 that allows a merchant associated with merchant system 108 to communicate information to transaction service provider system 102.

In some non-limiting embodiments, merchant system 108 may include one or more devices, computers, computer systems, and/or peripheral devices capable of being used by a merchant to conduct a transaction with a user. Merchant system 108 may include one or more magnetic stripe card readers, chip card readers, NFC receivers, RFID receivers, and/or other contactless transceivers or receivers, contact-based receivers, payment terminals, computers, servers, input devices, and/or other like devices that can be used to conduct a transaction.

In some non-limiting embodiments, merchant system 108 may include and/or be in communication with a remote POS system, which may refer to a system that performs the functions of a POS device and is hosted in a network. A remote POS system may be hosted on one or more computers instead of, or in addition to, a physical POS device at a merchant location (e.g., a retail store, etc.). A remote POS system may be hosted in or remote to the merchant location. As an example, a remote POS system may be a virtual POS system hosted in a cloud-computing environment (e.g., a cloud POS system). The remote POS system may be unique to a specific merchant and may be hosted by the merchant, by a transaction service provider, by an issuer institution, and/or by a third party.

Acquirer system 110 may include one or more devices capable of receiving information from transaction service provider system 102, issuer system 104, user device 106, merchant system 108, and/or emergency management system 112 via network 114 and/or communicating information to transaction service provider system 102, issuer system 104, user device 106, merchant system 108, and/or emergency management system 112 via network 114. For example, acquirer system 110 may include a computing device, a server, a group of servers, and/or other like devices. In some non-limiting embodiments, acquirer system 110 may be associated with an acquirer as described herein.

Emergency management system 112 may include one or more devices capable of receiving information from transaction service provider system 102, issuer system 104, user device 106, merchant system 108, and/or acquirer system 110 via network 114 and/or communicating information to transaction service provider system 102, issuer system 104, user device 106, merchant system 108, and/or acquirer system 110 via network 114. For example, emergency management system 112 may include a computing device, a server, a group of servers, and/or other like devices. In some non-limiting embodiments, emergency management system 112 may be part of (e.g., a component of) transaction service provider system 102.

Network 114 may include one or more wired and/or wireless networks. For example, network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
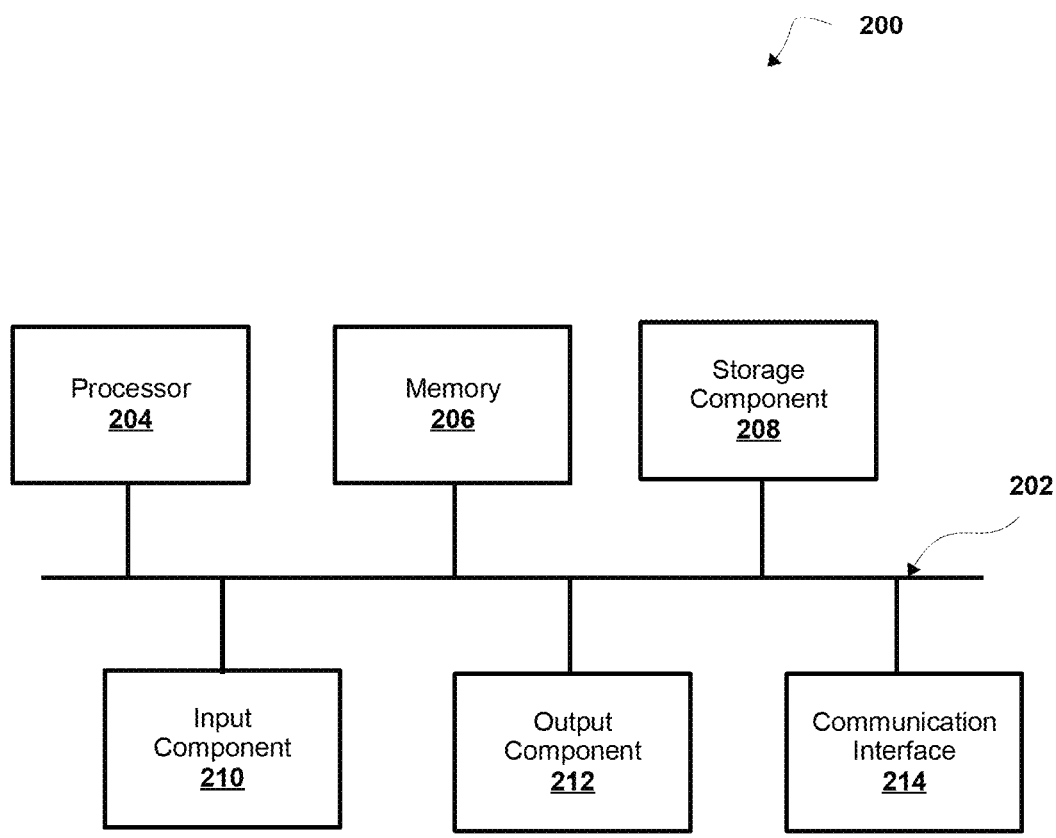
FIG. 2 is a diagram of a non-limiting embodiment of components of one or more devices of FIG. 1.

Referring now to FIG. 2, FIG. 2 is a diagram of example components of a device 200. Device 200 may correspond to transaction service provider system 102, issuer system 104, user device 106, merchant system 108, acquirer system 110, or emergency management system 112 and/or one or more devices of transaction service provider system 102, issuer system 104, merchant system 108, acquirer system 110, or emergency management system 112. In some non-limiting embodiments, transaction service provider system 102, issuer system 104, user device 106, merchant system 108, acquirer system 110, and/or emergency management system 112 may include at least one device 200 and/or at least one component of device 200. As shown in FIG. 2, device 200 may include a bus 202, a processor 204, a memory 206, a storage component 208, an input component 210, an output component 212, and a communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include a random access memory (RAM), a read only memory (ROM), and/or another type of dynamic or static storage device (e.g., a flash memory, a magnetic memory, an optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
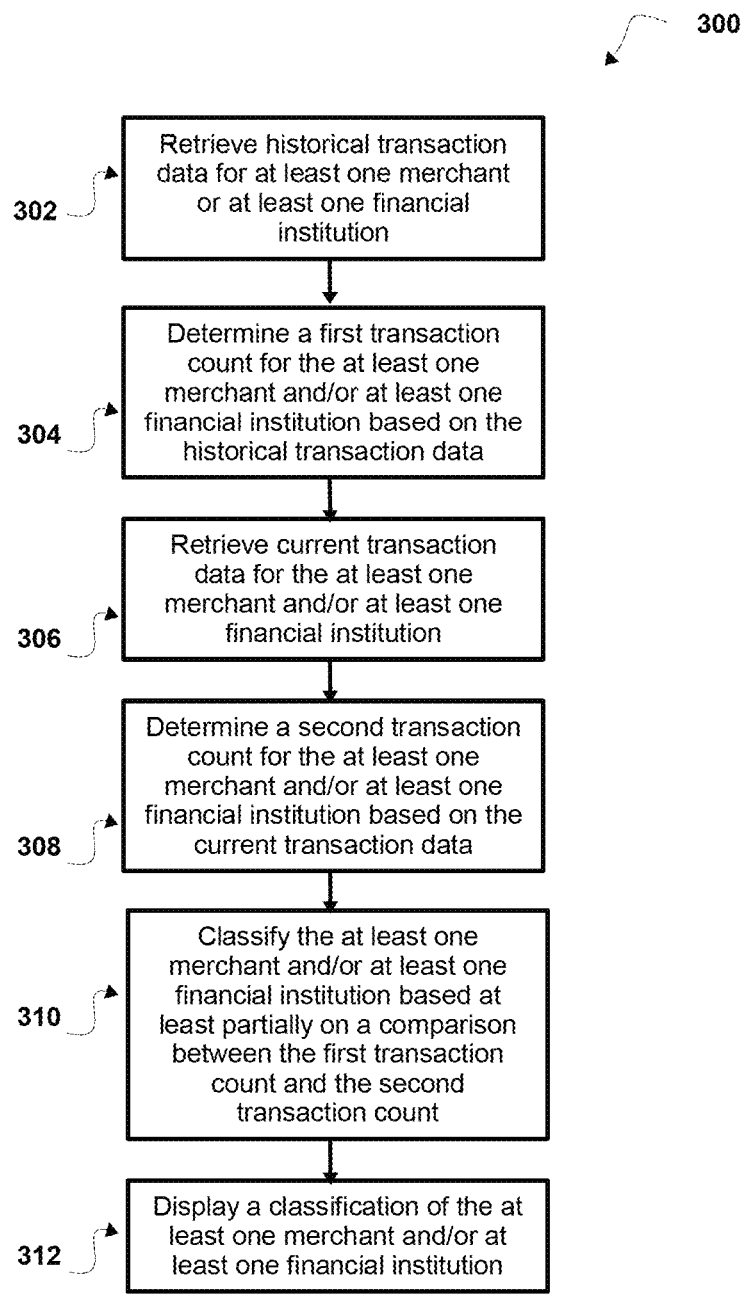
FIG. 3 is a flowchart of a non-limiting embodiment of a process for determining a status of at least one merchant and/or at least one financial institution during or after an emergency event according to the principles of the present invention.

Referring now to FIG. 3, FIG. 3 is a flowchart of a non-limiting embodiment of a process 300 for determining a status of at least one merchant and/or at least one financial institution during or after an emergency event. In some non-limiting embodiments, one or more of the steps of process 300 may be performed (e.g., completely, partially, etc.) by emergency management system 112. In some non-limiting embodiments, one or more of the steps of process 300 may be performed (e.g., completely, partially, etc.) by another device or a group of devices separate from or including emergency management system 112, such as transaction service provider system 102 (e.g., one or more devices of transaction service provider system 102), issuer system 104 (e.g., one or more devices of issuer system 104), user device 106, merchant system 108 (e.g., one or more devices of merchant system 108), or acquirer system 110 (e.g., one or more devices of acquirer system 110).

As shown in FIG. 3, at step 302, process 300 includes retrieving historical transaction data for at least one merchant and/or at least one financial institution. For example, emergency management system 112 may retrieve historical transaction data for at least one merchant or at least one financial institution. In some non-limiting embodiments, emergency management system 112 may retrieve historical transaction data for a merchant associated with a merchant category code (MCC), where the historical transaction data is associated with a time interval prior to an emergency event. For example, emergency management system 112 may retrieve historical transaction data during a time interval prior to an emergency event for a merchant based on an MCC of the merchant. In some non-limiting embodiments, emergency management system 112 may retrieve historical transaction data for a financial institution associated with a transaction type for a financial institution, where the historical transaction data is associated with a time interval prior to an emergency event. For example, emergency management system 112 may retrieve historical transaction data during a time interval prior to an emergency event for a financial institution based on a transaction type (e.g., an automatic teller machine (ATM) transaction type) for the financial institution.

In some non-limiting embodiments, a merchant (e.g., a merchant associated with merchant system 108) may include a merchant that provides fuel, such as a fueling station (e.g., a gas station and/or the like), a merchant that provides food, such as a retail food store (e.g., a grocery store and/or the like), a merchant that provides pharmaceutical products, such as a pharmacy (e.g., a drug store and/or the like), a merchant that provides home improvement products, such as a home improvement store (e.g., a hardware store and/or the like), and/or any other merchant that may sell goods and/or services (e.g., a merchant that may sell goods and/or services that are usable during an emergency).

In some non-limiting embodiments, a financial institution may include an automated teller machine (ATM) (e.g., an automated banking machine (ABM), a cash point, a cashline, a minibank, a cash machine, a cash dispenser, and/or the like), and/or the financial institution may be associated with an ATM machine (e.g., an ATM machine at a remote location from the financial institution).

In some non-limiting embodiments, transaction data (e.g., historical transaction data, current transaction data, and/or the like) may be associated with a payment transaction (e.g., a payment transaction of a plurality of payment transactions) and/or a plurality of payment transactions. For example, the transaction data may be associated with a payment transaction involving a user and a merchant. In some non-limiting embodiments, a plurality of payment transactions may involve a plurality of users and a plurality of merchants and each payment transaction of the plurality of payment transactions may involve a user and a merchant. In some non-limiting embodiments, the transaction data may be associated with an ATM transaction. For example, the transaction data may be associated with an ATM transaction involving a user that has an account with a financial institution that operates an ATM. In some non-limiting embodiments, the transaction data may include a transaction type for a financial institution. For example, the transaction data may include an ATM transaction type.

In some non-limiting embodiments, the transaction data associated with a payment transaction may include transaction amount data associated with an amount of the payment transaction (e.g., a cost associated with the transaction, a transaction amount, an overall transaction amount, a cost of one or more products involved in the payment transaction, and/or the like), transaction time data associated with a time at which the payment transaction occurred or a time at which the payment transaction was authorized (e.g., a time of day, a day of the week, a day of a month, a month of a year, a predetermined time of day segment such as morning, afternoon, evening, night, and/or the like, a predetermined day of the week segment such as weekday, weekend, and/or the like, a predetermined segment of a year such as first quarter, second quarter, and/or the like), transaction type data associated with a transaction type of the payment transaction (e.g., an online transaction, a card present transaction, a face-to-face transaction, and/or the like), and/or the like.

Additionally or alternatively, the transaction data may include user transaction data associated with the user involved in the payment transaction, merchant transaction data associated with the merchant involved in the payment transaction, and/or issuer institution transaction data associated with an issuer institution of an account involved in the payment transaction. In some embodiments, user transaction data may include user identity data associated with an identity of the user (e.g., a unique identifier of the user, a name of the user, and/or the like), user account data associated with an account of the user (e.g., an account identifier associated with the user, a PAN associated with a credit and/or debit account of the user, a token associated with a credit and/or debit account of the user, and/or the like), and/or the like.

In some embodiments, merchant transaction data may include merchant identity data associated with an identity of the merchant (e.g., a unique identifier of the merchant, a name of the merchant, and/or the like), merchant category data associated with at least one merchant category of the merchant (e.g., a code for a merchant category, an MCC, a name of a merchant category, a type of a merchant category, and/or the like), merchant account data associated with an account of the merchant (e.g., an account identifier associated with an account of the merchant, a PAN associated with an account of the merchant, a token associated with an account of the merchant, and/or the like), and/or the like. In some non-limiting embodiments, an MCC may identify a merchant category associated with fueling stations, grocery stores, hardware stores, and/or the like.

In some embodiments, issuer institution transaction data may include issuer institution identity data associated with the issuer institution that issued an account involved in the payment transaction (e.g., a unique identifier of the issuer institution, a name of the issuer institution, an issuer identification number (IIN) associated with the issuer institution, a bank identification number (BIN) associated with the issuer institution, and/or the like), and/or the like.

In some non-limiting embodiments, transaction data associated with a payment transaction (e.g., each payment transaction of a plurality of payment transactions) may identify a merchant category of a merchant (e.g., may identify a merchant category of a merchant via an MCC) involved in the payment transaction. For example, transaction data associated with the payment transaction may include merchant transaction data that identifies a merchant category of a merchant involved in the payment transaction. A merchant category may be information that is used to classify the merchant based on the type of goods or services the merchant provides. In some non-limiting embodiments, a payment transaction may involve a merchant that is associated with a merchant category of a plurality of merchant categories.

In some non-limiting embodiments, transaction data associated with a payment transaction may identify a time (e.g., a time of day, a day, a week, a month, a year, a predetermined time interval, and/or the like) at which the payment transaction occurred. For example, the transaction data associated with the payment transaction may include transaction time data that identifies a time at which the payment transaction occurred.

In some non-limiting embodiments, emergency management system 112 and/or transaction service provider system 102 may be in communication with one or more third-party databases. The one or more third-party databases may include a database having demographic data for different regions, Federal Emergency Management Agency (FEMA) databases, a database of census data for different regions, government benefit data for different regions and/or individuals, and/or other like data. In some non-limiting embodiments, the third-party database may be a government database.

As shown in FIG. 3, at step 304, process 300 includes determining a first transaction count for the at least one merchant and/or at least one financial institution based on the historical transaction data. For example, emergency management system 112 may determine a first transaction count (e.g., a first daily transaction count) for the at least one merchant or at least one financial institution based on the historical transaction data. In some non-limiting embodiments, emergency management system 112 may determine a first transaction count for the at least one merchant or at least one financial institution based on a predetermined time interval prior to a start of an emergency event. For example, emergency management system 112 may determine a first transaction count for the at least one merchant or at least one financial institution based on a predetermined time interval (e.g., a day, a period of days, a week, and/or the like) prior to an actual start, an estimated start, and/or the like, of an emergency event.

In some non-limiting embodiments, emergency management system 112 may determine a first transaction count for a merchant and/or a financial institution within a geographic area associated with an emergency event. For example, emergency management system 112 may determine a first transaction count for the merchant or the financial institution within a geographic area impacted by an emergency event.

In some non-limiting embodiments, a geographic area may be defined by a zip or postal code, a range or plurality of zip or postal codes, a town or city, a county, a state, and/or the like. In some non-limiting embodiments, a geographic area may be defined arbitrarily by any bounding perimeters as specified on a map, by longitude and latitude, or by any other means.

In some non-limiting embodiments, emergency management system 112 may determine a first transaction count for a merchant or a financial institution based on transaction data associated with an identification of the merchant or the financial institution, transaction data associated with a location (e.g., a state, a city, a postal code, a country, and/or the like) of the merchant or the financial institution, transaction data associated with an MCC of a merchant, transaction data associated with the transaction type for a financial institution, transaction data associated with a time of authorization of a transaction involving the merchant and/or the financial institution, and/or transaction data associated with an amount of a transaction involving the merchant and/or the financial institution.

As shown in FIG. 3, at step 306, process 300 includes retrieving current transaction data for the at least one merchant and/or at least one financial institution. For example, emergency management system 112 may retrieve current transaction data for the at least one merchant or at least one financial institution.

In some non-limiting embodiments, emergency management system 112 may retrieve current transaction data for a merchant having a specific MCC (e.g., an MCC associated with a fueling station, an MCC associated with a grocery store, an MCC associated with a hardware store, and/or the like). In some non-limiting embodiments, emergency management system 112 may retrieve the current transaction data at various time intervals. For example, emergency management system 112 may retrieve the current transaction data at daily time interval, a twice a day time interval (e.g., near noon and midnight), hourly, and/or the like. In some non-limiting embodiments, emergency management system 112 may retrieve the current transaction data at a predetermined time interval or on an on-demand basis. In some non-limiting embodiments, the predetermined time interval may include a predetermined time interval configured by a user (e.g., a subscriber, a client device associated with a subscriber, and/or the like) of emergency management system 112. In some non-limiting embodiments, emergency management system 112 may retrieve current transaction data for a financial institution based on a transaction type for a financial institution.

In some non-limiting embodiments, emergency management system 112 may determine an MCC associated with a merchant located in a geographical area based on a location of an emergency event and emergency management system 112 may retrieve historical transaction data and/or current transaction data for the merchant based on the MCC for the merchant. In some non-limiting embodiments, emergency management system 112 may retrieve historical transaction data and/or current transaction data for a merchant and/or a financial institution at a predetermined time interval or predetermined time intervals. For example, emergency management system 112 may retrieve current transaction data for a merchant and/or a financial institution twice a day.

As shown in FIG. 3, at step 308, process 300 includes determining a second transaction count for the at least one merchant and/or at least one financial institution based on the current transaction data. For example, emergency management system 112 may determine a second transaction count (e.g., a second daily transaction count) for the at least one merchant or at least one financial institution based on the current transaction data. In some non-limiting embodiments, emergency management system 112 may determine a second transaction count for the at least one merchant or at least one financial institution based on a predetermined time interval after a start of an emergency event. For example, emergency management system 112 may determine the second transaction count for the at least one merchant or at least one financial institution based on a predetermined time interval (e.g., a day, a period of days, a week, and/or the like) after an actual start, an estimated start, and/or the like, of an emergency event.

In some non-limiting embodiments, emergency management system 112 may determine a second transaction count for the at least one merchant or at least one financial institution within a geographic area associated with an emergency event. For example, emergency management system 112 may determine the second transaction count for the at least one merchant or at least one financial institution within a geographic area impacted by an emergency event.

In some non-limiting embodiments, emergency management system 112 may determine a second transaction count for the at least one merchant or at least one financial institution based on transaction data associated with an identification of a merchant or a financial institution, transaction data associated with a location (e.g., a state, a city, a postal code, a country, and/or the like) of a merchant or a financial institution, transaction data associated with an MCC of a merchant, transaction data associated with a transaction type for a financial institution, transaction data associated with a time of authorization of a transaction, and/or transaction data associated with an amount of a transaction.

As shown in FIG. 3, at step 310, process 300 includes classifying the at least one merchant and/or at least one financial institution based at least partially on a comparison between the first transaction count and the second transaction count. For example, emergency management system 112 may classify the at least one merchant or at least one financial institution based at least partially on a comparison between the first transaction count and the second transaction count. In some non-limiting embodiments, emergency management system 112 may classify the at least one merchant and/or the at least one financial institution according to an operational status of the at least one merchant and/or the at least one financial institution. In some non-limiting embodiments, the operational status of a merchant or a financial institution may include transacting, a non-transacting, recovered, non-recovered, and/or the like.

In some non-limiting embodiments, emergency management system 112 may determine a difference between the first transaction count and the second transaction count. Emergency management system 112 may compare the difference to a threshold value (e.g., a predetermined threshold value of a difference) to determine how to classify a merchant and/or a financial institution according to an operational status of the merchant and/or the financial institution. For example, emergency management system 112 may compare the difference to a threshold value of 25%, determine that the difference satisfies the threshold value, and determine to classify a merchant and/or a financial institution according to an operational status of transacting, recovered, and/or the like. For example, emergency management system 112 may compare the difference to a threshold value of 95%, determine that the difference satisfies the threshold value, and determine to classify a merchant and/or a financial institution according to an operational status of non-transacting, non-recovered, and/or the like.

In some non-limiting embodiments, emergency management system 112 may compare the second transaction count to a threshold (e.g., a threshold value of transaction data, a threshold value for a number of transactions, a threshold value for a time interval between transactions, and/or the like) obtained based on the historical transaction data and determine an operational status of the merchant. Emergency management system 112 may classify a merchant in one or more databases based on the operational status of the merchant.

In some non-limiting embodiments, the classifications of a merchant and/or a financial institution may be used for generating reports and/or audits. In some non-limiting embodiments, a map of a geographic area may be automatically generated and/or updated based on the operational status of a merchant and/or a financial institution. In some non-limiting embodiments, communications may be sent to a merchant based on the operational status of the merchant. For example, if a merchant is determined to be non-transacting, a communication may be sent to the merchant to determine if merchant is operational (e.g., able to conduct transactions).

In some non-limiting embodiments, emergency management system 112 may communicate a message (e.g., a notification message) to a merchant based on the operational status of another merchant. For example, if emergency management system 112 determines that a first merchant is a non-transacting merchant, emergency management system 112 may communicate a message to a second merchant (e.g., a second merchant having the same merchant category as the first merchant), where the message includes information associated with the operational status of the first merchant. In some non-limiting embodiments, if emergency management system 112 determines that a plurality of first merchants (e.g., a plurality of first merchants having a corresponding merchant category) are non-transacting, emergency management system 112 may communicate a message to a second merchant (e.g., a second merchant having the corresponding merchant category as the plurality of first merchants), where the message includes information associated with a notification communicated to the plurality of first merchants. For example, emergency management system 112 may communicate the message to the second merchant informing the second merchant of a shortage of a good and/or a service offered by one or more of the plurality of first merchants.

In some non-limiting embodiments, data associated with the classification may be prepared for communication (e.g., extraction) to an endpoint (e.g., be prepared for communication to endpoint by a Financial Services Information Sharing and Analysis Center (FS-ISAC) associated with transaction processing server 102). For example, the data associated with the classification may be prepared by removing (e.g., redacting, and/or the like) at least a portion of transaction data (e.g., data associated with transaction volumes, data associated with transaction amounts, and/or the like) from the data associated with the classification prior to communicating the data to the endpoint. In some non-limiting embodiments, the transaction data may be associated with an indication (e.g., an operational status of a merchant and/or a financial institution) of whether a merchant and/or a financial institution is conducting transactions, is not conducting transactions, is conducting transactions at a level (e.g., a specific level, a predetermined level, and/or the like), is conducting transactions at a time interval (e.g., a predetermined time interval), and/or the like.

In some non-limiting embodiments, the data associated with the classification may be communicated based on a subscription. For example, emergency management system 112 and/or transaction processing server 102 may distribute the data associated with the classification (e.g., redacted transaction data, and/or the like) to a group of subscribers. In some non-limiting embodiments, the group may include at least one of a governmental agency (e.g., US Department of Homeland Security (DHS), Federal Emergency Management Agency (FEMA), US Department of Treasury, and/or the like), a financial institution, a merchant, and/or the like.

As shown in FIG. 3, at step 312, process 300 includes displaying a classification of the at least one merchant and/or at least one financial institution. For example, emergency management system 112 may display a classification of the at least one merchant or at least one financial institution. In some non-limiting embodiments, emergency management system 112 display a map of a geographical area that includes a location of the at least one merchant, where the map includes an operational status of the at least one merchant and/or at least one financial institution. For example, emergency management system 112 display a map of a geographical area that includes a location of the at least one merchant and/or the at least one financial institution and the map may include an icon that indicates an operational status. In some non-limiting embodiments, the icon may include an indication (e.g., an indicium and/or like) of the merchant associated with the icon or the financial institution associated with the icon. For example, the indication may include an operational status of the merchant and a logo associated with the merchant. In some non-limiting embodiments, emergency management system 112 may determine a geographical area in which the at least one merchant and/or the at least one financial institution is located and emergency management system 112 may display a classification of the at least one merchant and/or the at least one financial institution within the geographical area.

In some non-limiting embodiments, emergency management system 112 may display a graphical user interface (GUI) based on classifying the at least one merchant and/or the at least one financial institution. For example, emergency management system 112 may display a GUI that includes a classification of the at least one merchant and/or the at least one financial institution based on classifying the at least one merchant and/or the at least one financial institution. In some non-limiting embodiments, emergency management system 112 may display a GUI that includes data associated with a classification of an operational status of the at least one merchant and/or the at least one financial institution.

Figure 4:
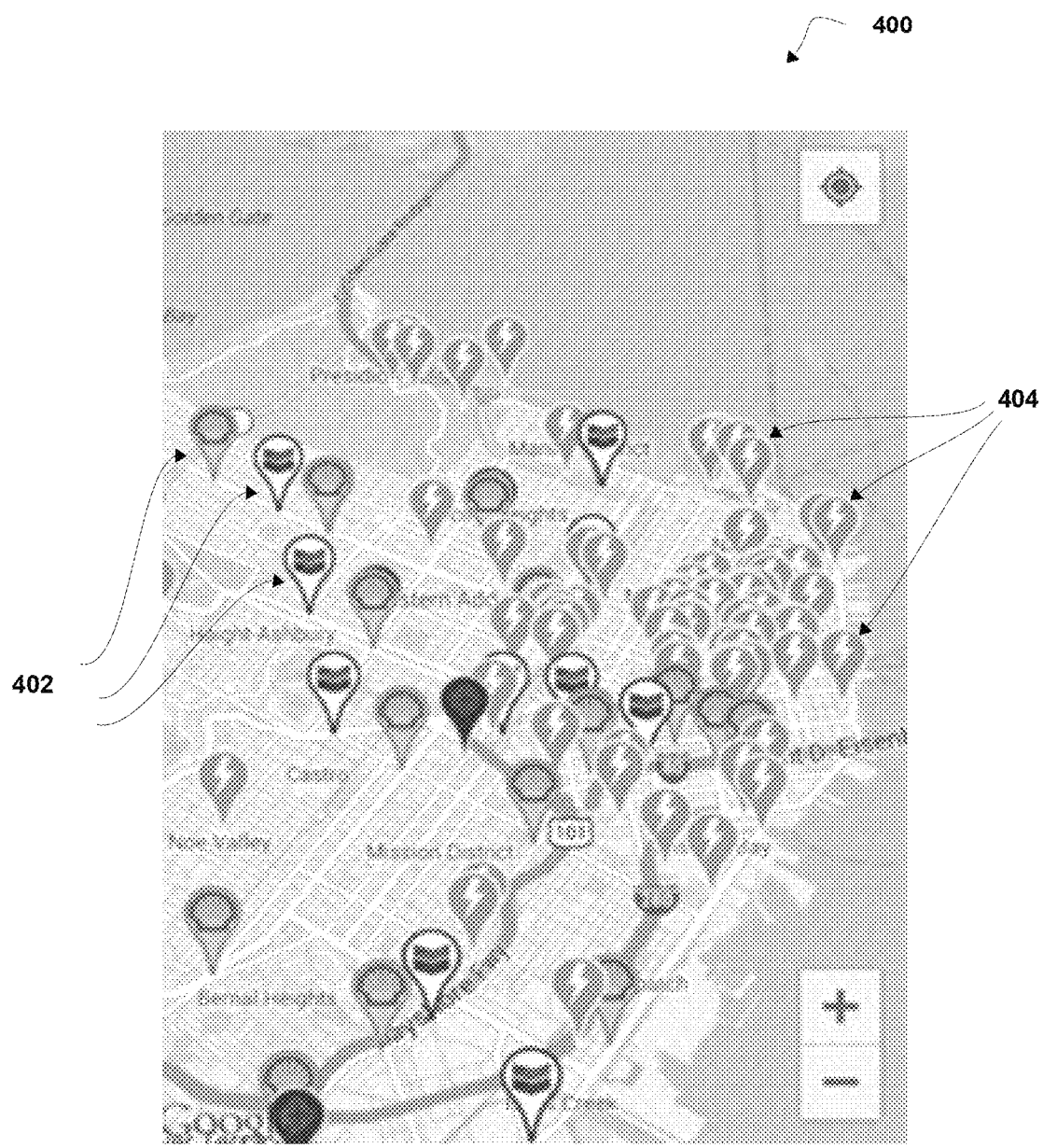
FIG. 4 is a graphical user interface (GUI) with an annotated map of a geographical area including merchant locations.

Referring now to FIG. 4, FIG. 4 is a graphical user interface (GUI) 400 with an annotated map of a geographical area including merchant locations. As shown in FIG. 4, GUI 400 may include a map of a geographic area (e.g., the state of New Jersey as shown in FIG. 4) with icons (e.g., pins) identifying locations of merchants (e.g., fueling stations) including indications associated with the operational status of the merchants may be generated based on the operational status of the merchant. As shown in FIG. 4, GUI 400 may include icons 402 indicating an operational status of a merchant that is operational and icons 404 indicating an operational status of a merchant that is non-operational.

Figure 5A:
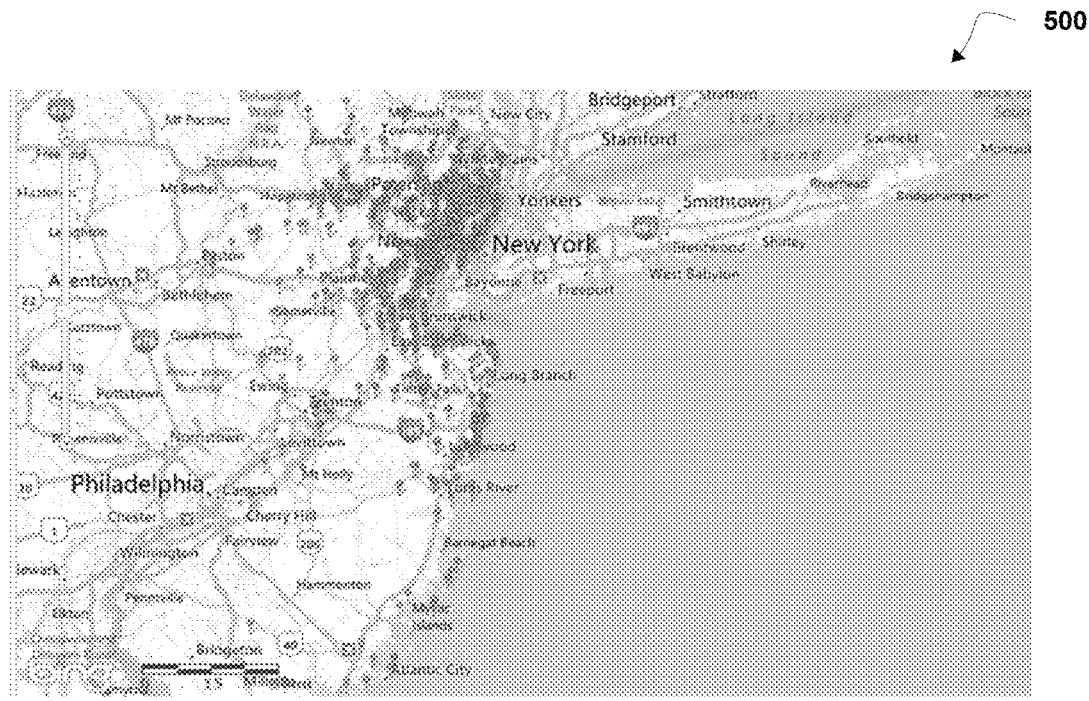
FIGS. 5A and 5B are annotated maps of a geographical area including merchant locations.
Figure 5B:

Referring now to FIGS. 5A and 5B, FIG. 5A shows a map 500 of a geographic area (e.g., the state of New Jersey as shown in FIGS. 5A and 5B) that illustrates fueling stations having an operational status that is non-operational at a first time interval, and FIG. 5B shows the map 500 of the geographic area illustrates fueling stations having an operational status that is non-operational at a second time interval, after the first time interval. Accordingly, merchants may be classified as being non-transacting merchants (e.g., merchants having an operational status of non-operational, and/or the like) between a first time interval and a second time interval.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for determining an operational status of at least one merchant during or after an emergency event comprising:

a transaction service provider system comprising at least one processor, wherein the at least one processor is programmed or configured to:

retrieve historical transaction data for at least one merchant associated with a merchant category code (MCC), wherein the historical transaction data is associated with a time interval prior to an emergency event;

determine a first transaction count for the at least one merchant based on the historical transaction data for the at least one merchant;

retrieve current transaction data for the at least one merchant, where the current transaction data is associated with a first time interval during or after the emergency event;

determine a second transaction count for the at least one merchant based on the current transaction data for the at least one merchant;

classify the at least one merchant based at least partially on a comparison between the first transaction count and the second transaction count;

display a classification of the at least one merchant based on classifying the at least one merchant;

retrieve updated current transaction data for the at least one merchant, the updated current transaction data associated with a second time interval after the first time interval;

determine a third transaction count for the at least one merchant based on the updated current transaction data;

change the classification of the at least one merchant based at least partially on a comparison between the first transaction count and the third transaction count; and change the displayed classification of the at least one merchant based on the classification of the at least one merchant based on the third transaction count.

2. The system of claim 1, wherein the MCC identifies at least one of the following merchant categories: fueling stations, grocery stores, hardware stores, or any combination thereof.

3. The system of claim 1, wherein, when classifying the at least one merchant, the at least one processor is programmed or configured to classify the at least one merchant according to an operational status of the at least one merchant.

4. The system of claim 3, wherein, when classifying the at least one merchant according to the operational status of the at least one merchant, the at least one processor is programmed or configured to classify the at least one merchant according to the operational status of the at one least merchant based at least partially on a predetermined threshold value of a difference between the first transaction count and the second transaction count.

5. The system of claim 1, wherein, when displaying a classification of the at least one merchant, the at least one processor is programmed or configured to display a map of a geographical area that includes a location of the at least one merchant, wherein the map includes an operational status of the at least one merchant.

6. The system of claim 1, wherein the at least one processor is further programmed or configured to determine a geographical area in which the at least one merchant is located; and
wherein, when displaying the classification of the at least one merchant, the at least one processor is programmed or configured to:
display the classification of the at least one merchant within the geographical area.

7. The system of claim 1, wherein the at least one merchant is a plurality of merchants, wherein the at least one processor is further programmed or configured to:
determine the MCC associated with the plurality of merchants located in a geographical area based on a location of the emergency event; and
wherein, when retrieving the historical transaction data for the plurality of merchants, the at least one processor is programmed or configured to:
retrieve the historical transaction data for the plurality of merchants based on the MCC for the plurality of merchants.

8. A computer-implemented method for determining an operational status of at least one merchant during or after an emergency event, comprising:
retrieving, with at least one processor, historical transaction data for at least one merchant associated with a merchant category code (MCC), wherein the historical transaction data is associated with a time interval prior to an emergency event;
determining, with at least one processor, a first transaction count for the at least one merchant based on the historical transaction data for the at least one merchant;
retrieving, with at least one processor, current transaction data for the at least one merchant, where the current transaction data is associated with a first time interval during or after the emergency event;
determining, with at least one processor, a second transaction count for the at least one merchant based on the current transaction data for the at least one merchant;
classifying, with at least one processor of a transaction service provider system, the at least one merchant based at least partially on a comparison between the first transaction count and the second transaction count;
displaying, with at least one processor, a classification of the at least one merchant based on classifying the at least one merchant;
retrieving, with at least one processor, updated current transaction data for the at least one merchant, the updated current transaction data associated with a second time interval after the first time interval;
determining, with at least one processor, a third transaction count for the at least one merchant based on the updated current transaction data;
changing, with at least one processor, the classification of the at least one merchant based at least partially on a comparison between the first transaction count and the third transaction count; and
changing, with at least one processor, the displayed classification of the at least one merchant based on the classification of the at least one merchant based on the third transaction count.

9. The computer-implemented method of claim 8, wherein the MCC identifies at least one of the following merchant categories: fueling stations, grocery stores, hardware stores, or any combination thereof.

10. The computer-implemented method of claim 8, wherein classifying the at least one merchant comprises classifying the at least one merchant according to an operational status of the at least one merchant.

11. The computer-implemented method of claim 10, wherein classifying the at least one merchant according to the operational status of the at least one merchant comprises classifying the at least one merchant according to the operational status of the at one least merchant based at least partially on a predetermined threshold value of a difference between the first transaction count and the second transaction count.

12. The computer-implemented method of claim 8, further comprising displaying a map of a geographical area that includes a location of the at least one merchant, wherein the map includes an operational status of the at least one merchant.

13. The computer-implemented method of claim 8, further comprising determining a geographical area in which the at least one merchant is located; and
wherein displaying the classification of the at least one merchant comprises:
displaying the classification of the at least one merchant within the geographical area.

14. The computer-implemented method of claim 8, wherein the at least one merchant is a plurality of merchants, the method further comprising:
determining the MCC associated with the plurality of merchants located in a geographical area based on a location of the emergency event; and
wherein retrieving the historical transaction data for the plurality of merchants comprises:
retrieving the historical transaction data for the plurality of merchants based on the MCC for the plurality of merchants.

15. A computer program product for determining an operational status of at least one merchant during or after an emergency event, the computer program product comprising at least one non-transitory computer-readable medium including one or more instructions that, when executed by at least one processor of a transaction service provider system, cause the at least one processor to:
retrieve historical transaction data for at least one merchant associated with a merchant category code (MCC), wherein the historical transaction data is associated with a time interval prior to an emergency event;
determine a first transaction count for the at least one merchant based on the historical transaction data for the at least one merchant;

retrieve current transaction data for the at least one merchant, where the current transaction data is associated with a first time interval during or after the emergency event;

determine a second transaction count for the at least one merchant based on the current transaction data for the at least one merchant;

classify the at least one merchant based at least partially on a comparison between the first transaction count and the second transaction count;

display a classification of the at least one merchant based on classifying the at least one merchant;

retrieve updated current transaction data for the at least one merchant, the updated current transaction data associated with a second time interval after the first time interval;

determine a third transaction count for the at least one merchant based on the updated current transaction data;

change the classification of the at least one merchant based at least partially on a comparison between the first transaction count and the third transaction count; and change the displayed classification of the at least one merchant based on the classification of the at least one merchant based on the third transaction count.

16. The computer program product of claim 15, wherein the one or more instructions, that cause the at least one processor to classify the at least one merchant, cause the at least one processor to classify the at least one merchant according to an operational status of the at least one merchant.

17. The computer program product of claim 16, wherein the one or more instructions, that cause the at least one processor to classify the at least one merchant according to the operational status of the at least one merchant, cause the at least one processor to classify the at least one merchant according to the operational status of the at one least merchant based at least partially on a predetermined threshold value of a difference between the first transaction count and the second transaction count.

18. The computer program product of claim 15, wherein the one or more instructions, that cause the at least one processor to display a classification of the at least one merchant, cause the at least one processor to display a map of a geographical area that includes a location of the at least one merchant, wherein the map includes an operational status of the at least one merchant.

19. The computer program product of claim 15, wherein the one or more instructions, when executed by the at least one processor, further cause the at least one processor to:
  determine a geographical area in which the at least one merchant is located; and
  wherein the one or more instructions, that cause the at least one processor to display the classification of the at least one merchant, cause the at least one processor to:
    display the classification of the at least one merchant within the geographical area.

20. The computer program product of claim 15, wherein the at least one merchant is a plurality of merchants, wherein the one or more instructions, when executed by the at least one processor, further cause the at least one processor to:
  determine the MCC associated with the plurality of merchants located in a geographical area based on a location of the emergency event; and
  wherein the one or more instructions, that cause the at least one processor to retrieve the historical transaction data for the plurality of merchants, cause the at least one processor to:
    retrieve the historical transaction data for the plurality of merchants based on the MCC for the plurality of merchants.

\* \* \* \* \*

UNITED STATES PATENT AND TRADEMARK OFFICE
CERTIFICATE OF CORRECTION

PATENT NO. : 10,783,566 B2  
APPLICATION NO. : 16/034767  
DATED : September 22, 2020  
INVENTOR(S) : Mahesh Joshi et al.

Page 1 of 1

It is certified that error appears in the above-identified patent and that said Letters Patent is hereby corrected as shown below:

In the Claims

Column 25, Lines 8-9, Claim 4, delete "of the at one least" and insert -- of the at least one --

Column 26, Line 25, Claim 11, delete "of the at one least" and insert -- of the at least one --

Column 28, Line 1, Claim 17, delete "of the at one least" and insert -- of the at least one --

Signed and Sealed this  
Fifteenth Day of December, 2020

Andrei Iancu  
*Director of the United States Patent and Trademark Office*